(12) United States Patent
Procopiuc et al.

(10) Patent No.: US 8,161,048 B2
(45) Date of Patent: Apr. 17, 2012

(54) DATABASE ANALYSIS USING CLUSTERS

(75) Inventors: Cecilia Magdalena Procopiuc, Summit, NJ (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 284 days.

(21) Appl. No.: 12/463,161

(22) Filed: May 8, 2009

(65) Prior Publication Data

US 2010/0274785 A1 Oct. 28, 2010

Related U.S. Application Data

(60) Provisional application No. 61/172,577, filed on Apr. 24, 2009.

(51) Int. Cl.
*G06F 7/00* (2006.01)
*G06F 17/00* (2006.01)

(52) U.S. Cl. .................. 707/737; 707/748; 707/798

(58) Field of Classification Search .................. 707/737, 707/748, 798
See application file for complete search history.

(56) References Cited

U.S. PATENT DOCUMENTS

| | | | |
|---|---|---|---|
| 5,276,789 A * | 1/1994 | Besaw et al. .................. 345/440 |
| 5,369,761 A | 11/1994 | Conley et al. |
| 5,600,831 A * | 2/1997 | Levy et al. ............. 707/999.002 |
| 5,655,116 A | 8/1997 | Kirk et al. |
| 5,701,453 A | 12/1997 | Maloney et al. |
| 5,706,503 A * | 1/1998 | Poppen et al. ......... 707/999.003 |
| 5,737,591 A | 4/1998 | Kaplan et al. |
| 5,878,407 A * | 3/1999 | Olgac .................... 707/999.001 |
| 5,897,632 A | 4/1999 | Dar et al. |
| 5,956,722 A | 9/1999 | Jacobson et al. |
| 5,970,489 A | 10/1999 | Jacobson et al. |
| 5,987,467 A | 11/1999 | Ross et al. |
| 5,999,192 A | 12/1999 | Selfridge et al. |
| 6,026,390 A | 2/2000 | Ross et al. |
| 6,032,144 A | 2/2000 | Srivastava et al. |
| 6,047,272 A | 4/2000 | Biliris et al. |
| 6,061,676 A | 5/2000 | Srivastava et al. |
| 6,070,157 A | 5/2000 | Jacobson et al. |
| 6,073,130 A | 6/2000 | Jacobson et al. |
| 6,134,553 A | 10/2000 | Jacobson et al. |
| 6,167,397 A | 12/2000 | Jacobson et al. |
| 6,212,552 B1 | 4/2001 | Biliris et al. |
| 6,338,058 B1 | 1/2002 | Jacobson et al. |
| 6,363,379 B1 | 3/2002 | Jacobson et al. |
| 6,366,901 B1 | 4/2002 | Ellis |
| 6,401,088 B1 | 6/2002 | Jagadish et al. |
| 6,434,573 B1 | 8/2002 | Jacobson et al. |

(Continued)

OTHER PUBLICATIONS

Procopiuc et al., Database Exploration Using Join Paths, ICDE, Apr. 12, 2008, pp. 1331-1333.*

(Continued)

*Primary Examiner* — Phong Nguyen
(74) *Attorney, Agent, or Firm* — Jackson Walker L.L.P.

(57) ABSTRACT

A method for mapping relationships in a database results in a cluster graph. A representative sample of records in each of a plurality of tables in the database is analyzed for nearest neighbor join edges instantiated by the record. Records with corresponding nearest neighbor join edges are grouped into clusters. Cluster pairs which share a join relationship between two tables are identified. A weighting may be applied to cluster pairs based on the number of records for the cluster pair. Meaningful cluster pairs above a weighted threshold may be ordered according to table and displayed as a cluster graph. Analyses of the cluster graph may reveal important characteristics of the database.

19 Claims, 6 Drawing Sheets

U.S. PATENT DOCUMENTS

| | | | |
|---|---|---|---|
| 6,438,608 B2 | 8/2002 | Biliris et al. | |
| 6,442,546 B1 | 8/2002 | Biliris et al. | |
| 6,477,534 B1 | 11/2002 | Acharya et al. | |
| 6,606,639 B2 | 8/2003 | Jacobson et al. | |
| 6,904,433 B2 | 6/2005 | Kapitskaia et al. | |
| 6,980,985 B1 | 12/2005 | Amer-Yahia et al. | |
| 6,996,567 B2 | 2/2006 | Ghukasyan | |
| 7,010,522 B1 | 3/2006 | Jagadish et al. | |
| 7,062,496 B2 | 6/2006 | Dettinger et al. | |
| 7,165,100 B2 | 1/2007 | Cranor et al. | |
| 7,185,012 B1 | 2/2007 | Koudas et al. | |
| 7,219,091 B1 | 5/2007 | Bruno et al. | |
| 7,340,467 B2* | 3/2008 | Najork | 707/802 |
| 7,356,528 B1 | 4/2008 | Amer-Yahia et al. | |
| 7,415,461 B1 | 8/2008 | Guha et al. | |
| 7,440,957 B1 | 10/2008 | Kotidis et al. | |
| 7,444,326 B1 | 10/2008 | Jagadish et al. | |
| 7,451,144 B1 | 11/2008 | Koudas et al. | |
| 7,451,214 B1 | 11/2008 | Cranor et al. | |
| 7,454,415 B1 | 11/2008 | Bruno et al. | |
| 7,483,887 B1 | 1/2009 | Bruno et al. | |
| 7,523,091 B2 | 4/2009 | Kapitskaia et al. | |
| 7,590,657 B1 | 9/2009 | Cormode et al. | |
| 7,623,534 B1 | 11/2009 | Ramakrishnan et al. | |
| 7,630,967 B1 | 12/2009 | Srivastava et al. | |
| 7,631,074 B1 | 12/2009 | Srivastava et al. | |
| 7,657,503 B1 | 2/2010 | Cormode et al. | |
| 7,664,749 B1 | 2/2010 | Koudas et al. | |
| 7,664,806 B1 | 2/2010 | Koudas et al. | |
| 7,668,801 B1 | 2/2010 | Koudas et al. | |
| 7,831,711 B2 | 11/2010 | Cranor et al. | |
| 7,849,091 B1* | 12/2010 | Cho et al. | 707/743 |
| 7,904,444 B1 | 3/2011 | Koudas et al. | |
| 7,904,458 B2 | 3/2011 | Koudas et al. | |
| 7,921,100 B2 | 4/2011 | Hadjieleftheriou et al. | |
| 2001/0009017 A1 | 7/2001 | Biliris et al. | |
| 2002/0059380 A1 | 5/2002 | Biliris et al. | |
| 2002/0138467 A1 | 9/2002 | Jacobson et al. | |
| 2003/0055950 A1 | 3/2003 | Cranor et al. | |
| 2003/0097355 A1 | 5/2003 | Kapitskaia et al. | |
| 2004/0210826 A1* | 10/2004 | Najork | 715/501.1 |
| 2005/0007383 A1* | 1/2005 | Potter et al. | 345/619 |
| 2005/0027717 A1 | 2/2005 | Koudas et al. | |
| 2005/0131946 A1 | 6/2005 | Korn et al. | |
| 2005/0203897 A1 | 9/2005 | Kapitskaia et al. | |
| 2006/0053122 A1 | 3/2006 | Korn et al. | |
| 2006/0112090 A1 | 5/2006 | Amer-Yahia et al. | |
| 2006/0224609 A1 | 10/2006 | Cormode et al. | |
| 2008/0052268 A1 | 2/2008 | Koudas et al. | |
| 2008/0140619 A1 | 6/2008 | Srivastava et al. | |
| 2008/0154891 A1 | 6/2008 | Amer-Yahia et al. | |
| 2009/0052448 A1 | 2/2009 | Ramakrishnan et al. | |
| 2009/0052449 A1 | 2/2009 | Ramakrishnan et al. | |
| 2009/0063681 A1 | 3/2009 | Ramakrishnan et al. | |
| 2009/0106417 A1 | 4/2009 | Cranor et al. | |
| 2009/0138469 A1 | 5/2009 | Koudas et al. | |
| 2009/0138470 A1 | 5/2009 | Koudas et al. | |
| 2009/0150339 A1 | 6/2009 | Bruno et al. | |
| 2009/0171944 A1 | 7/2009 | Hadjieleftheriou et al. | |
| 2009/0287721 A1 | 11/2009 | Golab et al. | |
| 2009/0292726 A1 | 11/2009 | Cormode et al. | |
| 2010/0023512 A1 | 1/2010 | Ramakrishnan et al. | |
| 2010/0042581 A1 | 2/2010 | Srivastava et al. | |
| 2010/0042606 A1 | 2/2010 | Srivastava et al. | |
| 2010/0058405 A1 | 3/2010 | Ramakrishnan et al. | |
| 2010/0100538 A1 | 4/2010 | Koudas et al. | |
| 2010/0100552 A1 | 4/2010 | Koudas et al. | |
| 2010/0100553 A1 | 4/2010 | Koudas et al. | |
| 2010/0114840 A1 | 5/2010 | Srivastava et al. | |
| 2010/0114920 A1 | 5/2010 | Srivastava et al. | |
| 2010/0125559 A1 | 5/2010 | Hadjieleftheriou et al. | |
| 2010/0132036 A1 | 5/2010 | Hadjieleftheriou et al. | |
| 2010/0138443 A1 | 6/2010 | Ramakrishnan et al. | |
| 2010/0153064 A1 | 6/2010 | Cormode et al. | |
| 2010/0153379 A1 | 6/2010 | Cormode et al. | |
| 2010/0268719 A1 | 10/2010 | Cormode et al. | |
| 2010/0293129 A1 | 11/2010 | Dong et al. | |
| 2010/0318519 A1 | 12/2010 | Hadjieleftheriou et al. | |
| 2011/0041184 A1 | 2/2011 | Cormode et al. | |
| 2011/0047185 A1* | 2/2011 | Cho et al. | 707/797 |
| 2011/0060818 A1 | 3/2011 | Cranor et al. | |
| 2011/0066600 A1 | 3/2011 | Cormode et al. | |
| 2011/0083125 A1* | 4/2011 | Komatsu et al. | 717/149 |

OTHER PUBLICATIONS

Dasu, T., et al., Mining database structure; or, how to build a data quality browser. SIGMOD, p. 24-251, 2002.

DBLife, http://dblife.cs.wisc.edu/, Date: Aug. 31, 2008.

Huhtala, Y. et al., Efficient discovery of functional and approximate dependencies using partitions. ICDE, 1998.

Kotidis, Y., et al., Circumventing data quality problems using multiple join paths. CleanDB, 2006.

Liu, F., et al., Effective keyword search in relational databases. SIGMOD, 2006.

Minkov, E., et al., Contextual search and name disambiguation in email using graphs. SIGIR, 2006.

Spiegel, J. et al., Graph-based synopses for relational selectivity estimation. SIGMOD, 2006.

Bhalotia, G., et al., Keyword searching and browsing in databases using banks. ICDE, 2002.

Dai, B., et al., Rapid identification of column heterogeneity. ICDM, 2006.

Procopiuc, C. M., et al., Database exploration using join paths. ICDE, 2008.

Procopiuc, C. M., et al., Database exploration using meaningful join paths. ICDE, 2008.

Hernandez, M.A., et al., Clio: A semi-automatic tool for schema mapping. SIGMOD, 2001.

Koren, Y., et al., Measuring and extracting proximity in networks. SIGKDD, p. 245-255, 2006.

* cited by examiner

DATABASE ANALYSIS USING CLUSTERS

BACKGROUND

1. Field of the Disclosure

The present disclosure relates to database analysis and, more particularly, to analyzing databases using clusters of records.

2. Description of the Related Art

Complex databases may have a large number of tables and join relationships between data elements in the tables. Database schema representations, such as schema graphs, of complex databases may show a large number of join paths between tables. Expert knowledge of the particular database implementation is often required in order to efficiently query the database.

DESCRIPTION OF THE EMBODIMENT(S)

In one aspect, a disclosed method for mapping relationships in a database includes generating a directed schema graph for the database, grouping samples of records within tables of the database into clusters, wherein said grouping (e.g., clustering) includes approximating for said tables classes indicative of a table-reach equivalent class and/or a join-path equivalent class, and identifying cluster pairs, wherein a cluster pair represents a join relationship between clusters in two tables of the database. The method may further include generating a first mapping of the cluster pairs, wherein cluster pairs are weighted according to a number of associated records. In some embodiments, the first mapping is stored in a first storage device.

In some instances, the sample of records may be a random sample of records, while the sample size may be respectively proportional to the total number of records for a given table. Generating the first mapping may discriminate the weighting at a threshold, such that weightings below the threshold may not be included in the mapping. The clusters of cluster pairs weighted below the threshold may be combined into common clusters in individual tables of the database.

In some embodiments, the method further includes generating a second mapping using the first mapping, wherein the cluster pairs are ordered according to the tables of the database in the second mapping, and storing the second mapping in a second storage device. The second mapping may be displayed as a schema graph on a display device.

In some implementations, the method still further includes selecting a source cluster and a target cluster, wherein the source and target cluster are in different tables of the database, and calculating a probability that a random walk from the source cluster will reach the target cluster, wherein the random walk involves random selection of join relationships to advance between clusters, such that a given cluster is not selected more than once for the random walk. The probability may be output to a processing device.

In another aspect, a disclosed computer system for generating a schema graph of a database, includes a processor, and memory media accessible to the processor, including processor executable instructions. The instructions may be executable to determine or identify nearest neighbor join edges for a sample of records in the tables of the database, group records within tables of the database into clusters based on corresponding nearest neighbor join edges, and cluster pairs, wherein a cluster pair represents a join relationship between clusters in two tables of the database. The instructions may be executable to limit the maximum number of total join edges in the join relationship. The instructions may further be executable to order the clusters according to the tables of the database to which the clusters belong, wherein the cluster pairs are weighted according to a number of records in clusters of a cluster pair.

The computer system may further include a storage device, and a display device, along with instructions executable to store the ordered clusters as a cluster graph on the storage device, and display the cluster graph on the display device.

In some embodiments, the instructions are further executable to apply a threshold to the weighted cluster pairs, wherein weighted cluster pairs below the threshold are not included in the ordered clusters. The sample of records may be a representative sample for individual tables in the database.

In some cases, the instructions are further executable to select a source cluster from a first table and a target cluster from a second table, wherein the first and second tables are different tables in the database, and calculate a probability that a random walk from the source cluster will reach the target cluster, wherein the random walk involves random selection of join relationships to advance between tables, such that a given cluster is not selected more than once for the random walk. The calculated probability may be used to compare the join relationships between the first and second tables. The instructions may still further be executable to select a third table in the database, wherein the third table shares a join relationship with the first table, and use the calculated probability to determine the relative frequency, with respect to the first table, with which the second table is reached from the third table.

In yet another aspect, disclosed computer-readable memory media include processor instructions for generating schema graphs of databases. The instructions may be executable to group records within tables of the database into clusters based on matching nearest neighbor join edges for a sample of records in the tables, wherein records in a first cluster belonging to a first table share a join relationship, not exceeding a predetermined number of join edges, with a second cluster belonging to a second table, wherein the first and second clusters form a cluster pair, and identify cluster pairs for clusters in the database. The instructions may further be executable to order the clusters according to tables to which the clusters belong, wherein the cluster pairs are weighted according to a number of records in clusters of a cluster pair.

In some instances, the instructions are executable to repeat the instructions executable to select and to calculate, wherein a different target cluster is selected from among the clusters in a plurality of tables of the database, and wherein a plurality of probabilities corresponding to the plurality of tables in the database is calculated. The plurality of calculated probabilities may be used to compare the join relationships between the plurality of tables in the database.

In still a further aspect, a method for identifying meaningful join paths in a relational database having a plurality of tables, each table having a plurality of records, is disclosed. The method includes identifying clusters in the tables, wherein records within a cluster all instantiate a common set of neighboring join edges, and identifying cluster pairs, wherein a cluster pair includes a first cluster from a first table and a second cluster from a second table and further wherein the first cluster and the second cluster share a join relationship. The method may further include for at least some of the identified cluster pairs, determining a number of records in the first and second clusters that instantiate the shared relationship, and storing a cluster pair matrix indicative of the cluster pairs and their corresponding numbers of records.

In some embodiments, the identifying is performed for a representative sample of records in the tables. The method may still further include weighting the cluster pairs according to their corresponding number of records, wherein a threshold is applied to the weighted cluster pairs, wherein weighted cluster pairs below the threshold are not included in the cluster pair matrix.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
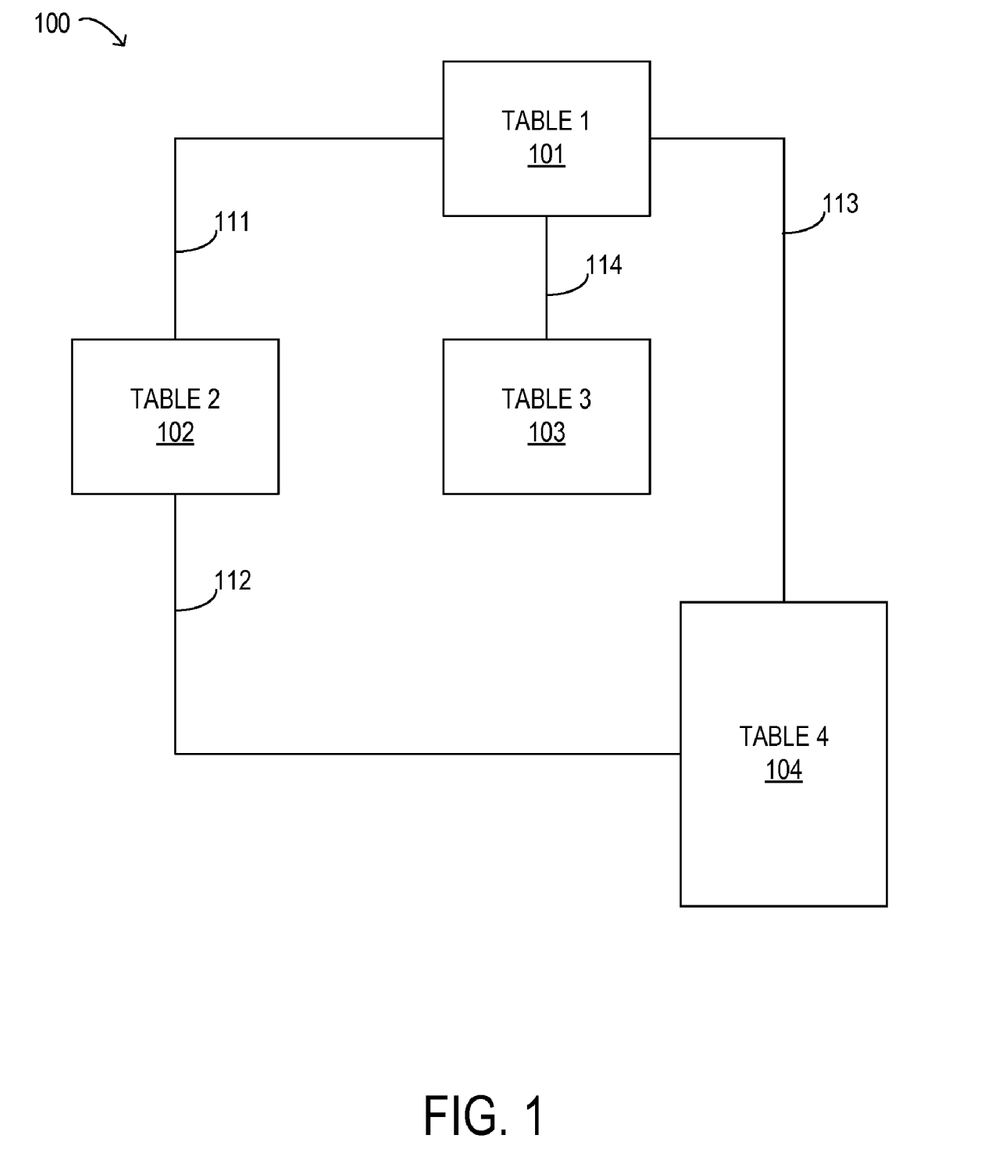
FIG. 1 is a block diagram of selected elements of a conventional database schema.

Turning now to the drawings, FIG. 1 is a block diagram of selected elements of a prior art database schema 100, also referred to as a "schema graph." Database schema illustrate relationships between tables in a database. As used herein, a "table" refers to an orthogonal data structure having rows and columns of individual data elements. The "columns" of a table generally define different data fields, which may be of specified data types, such as integer, numeric, text, enumerated lists, etc. The "rows" in a table refer to a data entry which may include one element for each column in the table. An individual row in a table is also referred to as a "record" or "tuple." As used herein, a "join relationship" refers to a join operation between elements shared between two tables in a database. For example, sharing the same values in a particular column by records in two tables, and relating these values to the corresponding records in each table, describes a join relationship. The records are said to be "joined" or "share" a join relationship. A "join path," as used herein, refers to a join relationship between two tables, or elements within two tables, of a database. A "join edge" refers to the relationship of two tables by a particular join path of length 1. A join path is a sequence of join edges in the schema graph. For example, as shown in FIG. 1, the sequence of join edges 114, 111, and 112 form a join path connecting Table 3 103 to Table 4 104.

As shown in FIG. 1, schema 100 includes four tables 101-104 and four relationships between the tables indicated by join edges 111-114. Schema 100 shows, for example, that table 1 101 is related to table 4 104 by relationship or join edge 113. Even if it is known that relationship 113 is a join relationship, it is still not evident from schema 100 which records from either table 1 101 or table 4 104 are involved in relationship 113. The number of records involved in a join relationship may indicate the relative importance, or meaningfulness, of the join path and/or the two tables involved in the join path. Thus, from schema 100, the importance of relationship 113, relative to other relationships, cannot be ascertained with respect to the number of records involved in relationship 113. The same is true for the other relationships 111, 112 and 114 shown in schema 100.

Accordingly, while schema 100 may be useful to describe some aspects of the underlying database system, some important information remains hidden. Discovering this hidden information can be a painstaking and resource-intensive process. For users seeking to perform maintenance or debugging of a complex database system, using a schema graph, such as schema 100, may only be partially useful as a roadmap to understanding the operational functionality of the database.

Figure 2:
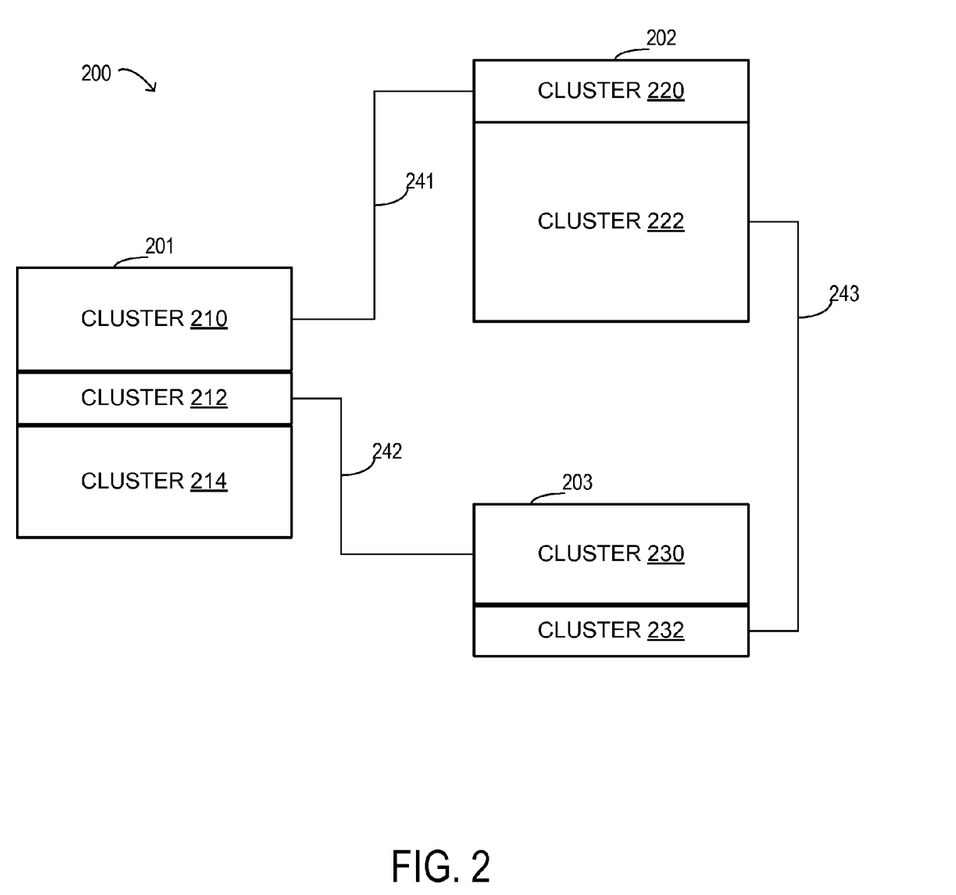
FIG. 2 is a block diagram of selected elements of an embodiment of a cluster graph.

Referring to FIG. 2, a block diagram of selected elements of an embodiment of a cluster graph 200 are shown. Cluster graph 200, as depicted in FIG. 2, is exemplary and has been simplified for clarity. Cluster graph 200 includes tables 201-203 and join relationships (i.e., join edges) 241-243. Tables 201-203 are shown including individual clusters. A "cluster" is a group of records in a table that instantiate common nearest neighbor join edges (NNE). A "neighbor" in this context refers to a table, or cluster in a table, that shares a join edge (i.e., a join path of length 1). As described in more detail with respect to FIG. 3, certain constrains may be applied when identifying NNEs.

Taking, for example, table 202, it is shown having cluster 220 and cluster 222. Although the clusters in the tables of cluster graph 200 are shown as contiguous blocks in FIG. 2, the records comprising the clusters may be distributed throughout each table. For example, a cluster may represent a random sampling of records in a table. The representation of a table in FIG. 2 may also omit certain records from the table, such as those that do not participate in join relationships. Cluster 214 in table 201 is shown without any join relationships (i.e., join edges or join paths), which may indicate that this cluster joins to a table not shown in cluster graph 200, or that relationships for cluster 214 are weighted below a threshold value, as will be discussed in detail below.

Thus, tables in FIG. 2 are shown as combinations of clusters in cluster graph 200. The relative size (i.e., height) of a cluster in cluster graph 200 may serve as an indicator of the number of records that instantiate a common NNE for that cluster. For example, cluster 210 shares join relationship 241 with cluster 220, whereby cluster 210 may be populated with more records in the join than cluster 220. This may indicate that join relationship 241 is a n:m join, such that each of n records in cluster 220 joins with one or more records in cluster 210. This may result in m joined records in cluster 210, whereby m>n. Similarly cluster 212 in table 201 joins cluster 230 in table 203 via relationship 242, while cluster 222 in table 202 joins cluster 232 in table 203 via relationship 243.

Figure 3:
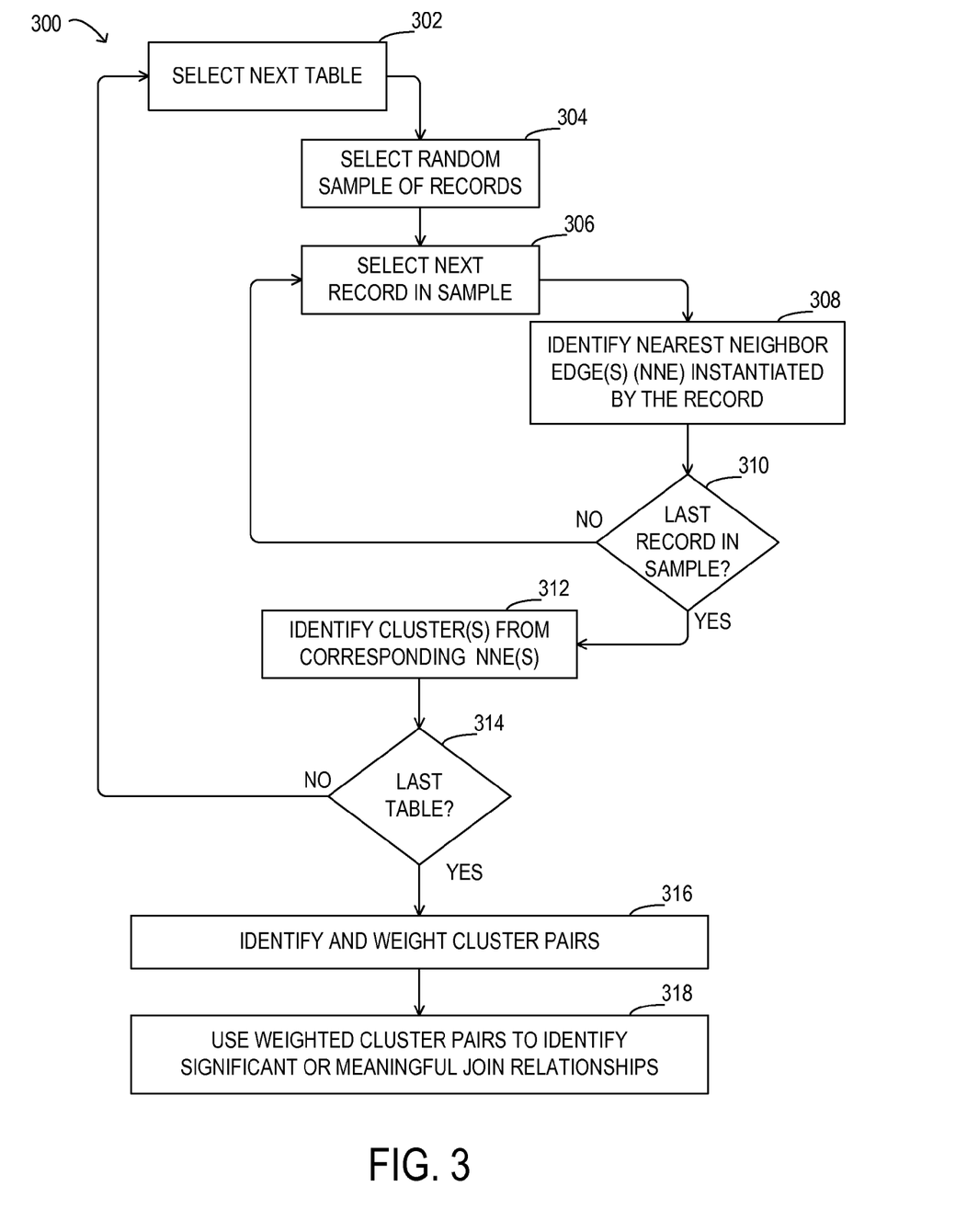
FIG. 3 is a block diagram of selected elements of an embodiment of a clustering process.

Turning now to FIG. 3, a block diagram of selected elements of an embodiment of a clustering process 300 are shown. In some embodiments, the process 300 is executed on a database system, for which little documentation or expert knowledge is available, in order to estimate which tables, clusters and join paths are most significant or meaningful. Process 300 represents a method that may be automatically performed within a reasonable time without detailed prior knowledge of a particular complex database system. In some embodiments, the result of process 300 is used to generate a cluster graph.

Process 300 is executable on a plurality of tables in the database system. In certain embodiments, some or all tables in the database system are selected prior to beginning process 300. A next table from the plurality of tables is selected for processing and is referred to below as the "current table" (operation 302). A sample of records is then selected from the current table, also referred to as "sampled records" (operation 304). In operation 304, the sample of records may be representative for all the records in the current table. In some embodiments, a random sample of records is selected. Further, the number of sampled records may be proportional to the overall number of records in the current table. For example, a random sample of 10% of all records may be selected in operation 304. The fraction of sampled records may be adjusted according to a desired accuracy, i.e., acceptable error, of the results of process 300. It is noted that the size of the sample selected in operation 304 may also reflect other considerations, such as computational resources, processing requirements, bandwith, execution time, etc., for performing process 300 in a given situation. In some cases, the sample size selected in a given iteration of process 300 depends on the current table, or otherwise varies. In one example, the sample size is itself a function of the number of records in a table.

A next sample from the sample records is then selected for processing (operation 306), and referred to as the "current record." The NNE instantiated by the current record are identified (operation 308). A record may instantiate zero, one or a plurality of NNEs. In some embodiments, the NNEs for the current record are also stored in operation 308.

In one embodiment, identifying NNEs in operation 308 includes approximating classes for one or more tables within a schema graph. Each such class is indicative of a table-reach equivalent class, a join-path equivalent class, or both. As used herein, two distinct tuples are considered: (i) table-reach equivalent if the two subsets of tables reachable from the first tuple, respective to the second tuple, via join paths are identical and (ii) join-path equivalent if the two subsets of schema-level join paths instantiated from the first tuple, respective to the second tuple, are identical. In a further embodiment, directions to the join edges of the underlying schema graph are added such that only join paths on the now directed graph are considered. Further, classes may be represented implicitly by storing unions of similar classes together. In this embodiment, for each table in the schema graph, a graph G may be obtained by imposing the following constraints: (1) all join edges are incident on a primary key; (2) join paths have maximum length L, where L is a parameter; and (3) the graph G is a directed acyclic graph (DAG). It will be appreciated by those skilled in the art, that by varying the parameter L, a corresponding impact in accuracy and storage space required to represent graph G will result. It will further be appreciated by those skilled in the art that the third constraint is imposed because of the inherent directionality of join paths starting from the selected table and because the number of combinatorially distinct join paths in a DAG is significantly smaller than in the underlying undirected graph. It will be further appreciated that in other embodiments, directions to the join edges of the underlying schema graph may not be added so that all join edges on an undirected graph are considered.

Continuing with process 300, a decision is made whether or not the current record is the last of the sampled records (operation 310). If the result of operation 310 is NO, then process 300 loops back to operation 306, where the next current record is selected.

If the result of operation 310 is YES, then all the sampled records have been processed by operation 308, and process 300 continues by identifying cluster(s) in the current table based on common NNE(s) for the sampled records (operation 312). In one embodiment, identifying applicable cluster(s) within a table includes storing a random sample of the applicable tuples. The clusters of the applicable source table may be an approximation (via union) of the join-path equivalent classes of the source table, where the approximation is computed by ignoring the effect of other tables that are farther than a pre-determined number of join edges from the source table.

One possible result of operation 312 is that no clusters are identified, for example, if no join relationships exist in the current table. In addition to identifying cluster(s), the number of records in each cluster may be recorded in operation 312.

A decision is then made if the current table is the last table in the selected plurality of tables (operation 314). If the result of operation 314 is NO, then process 300 loops back to operation 302, where the next current table is selected.

If the result of operation 314 is YES, then all the selected plurality of tables in the database have been processed by operation 312, resulting in the identification of clusters and selected join relationships for all selected tables. At this point in process 300, cluster pairs may be identified and weighted according to the number of records in each constituent cluster (operation 316). A "cluster pair" refers to two clusters in two neighboring tables that share a join edge. In some embodiments, a threshold for the weighting is determined in operation 316. For example, the threshold may be a percentage of the maximum number of records found in a cluster and/or table. The percentage may vary by cluster and/or table. Clusters may further be classified, according to the threshold value, or other criteria, in operation 316.

The weighted cluster pairs are then used to identify significant and/or meaningful join paths (operation 318). In some embodiments, cluster pairs below the threshold are filtered out (i.e., discriminated), either in operation 316 or 318. Discriminated clusters may be collectively grouped into a single cluster, or block entity, for each table and so included in the cluster graph. Other criteria may be used to classify or adjust the weighting of cluster pairs in operation 318. In some embodiments, the list of significant and/or meaningful join paths is stored in a storage device. The meaningful join paths and cluster pairs may be stored in matrix form, and be used for further processing by a processing device. As will be discussed below, the results of operation 318 in process 300 may also be used to depict a cluster graph.

Figure 4:
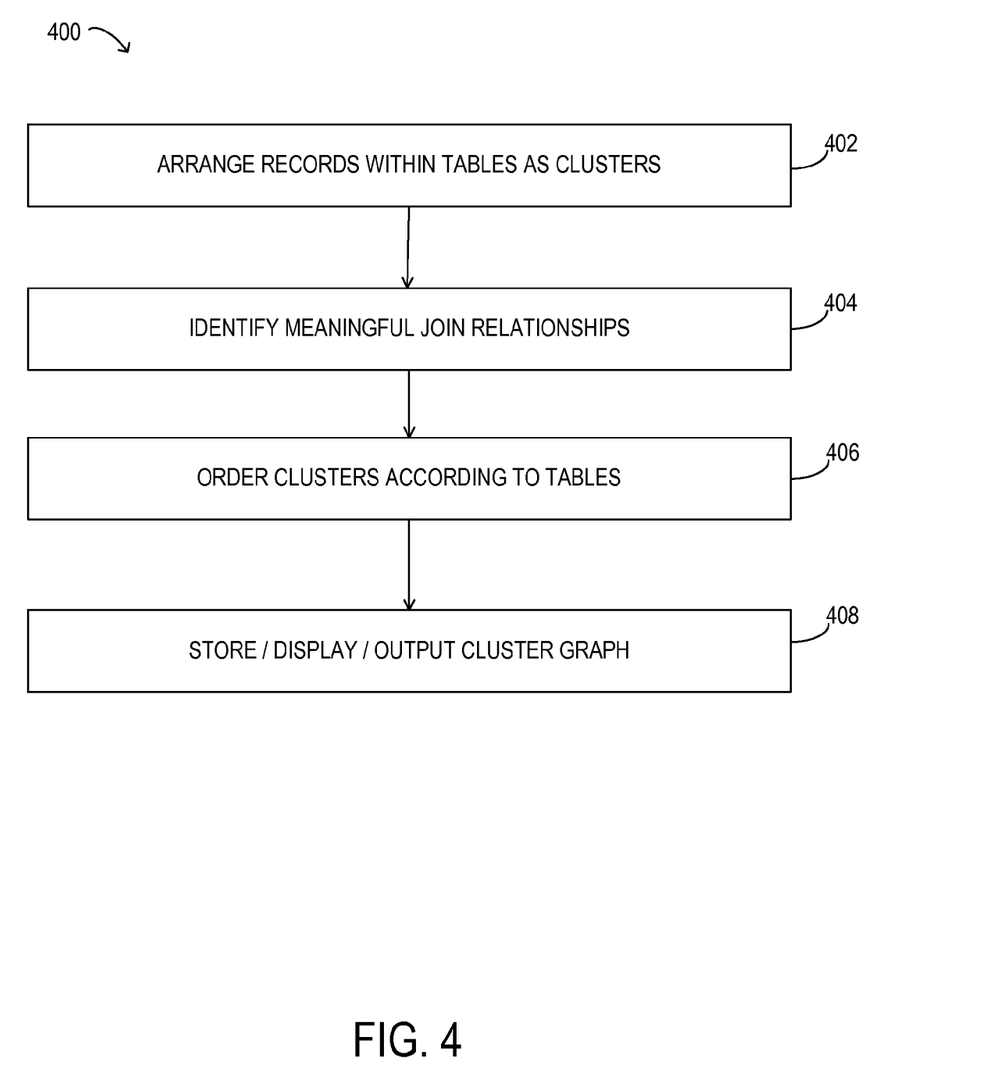
FIG. 4 is a block diagram of selected elements of an embodiment of a cluster graph process.

In FIG. 4, a block diagram of selected elements of an embodiment of a cluster graph process 400 are depicted. First, the records within tables of the database are arranged according to clusters (operation 402). Meaningful join relationships between cluster pairs are then identified (operation 404). In some embodiments, process 300 in FIG. 3 is used to implement operations 402 and/or 404. The clusters can then be ordered according to the tables to which they belong (operation 406). The ordered clusters can be used to generate a cluster graph, which can be stored on a storage device, displayed on a display device, and/or output for further processing (operation 408). In one embodiment, a cluster graph similar to that depicted in FIG. 2 is generated in operation 408.

Figure 5:
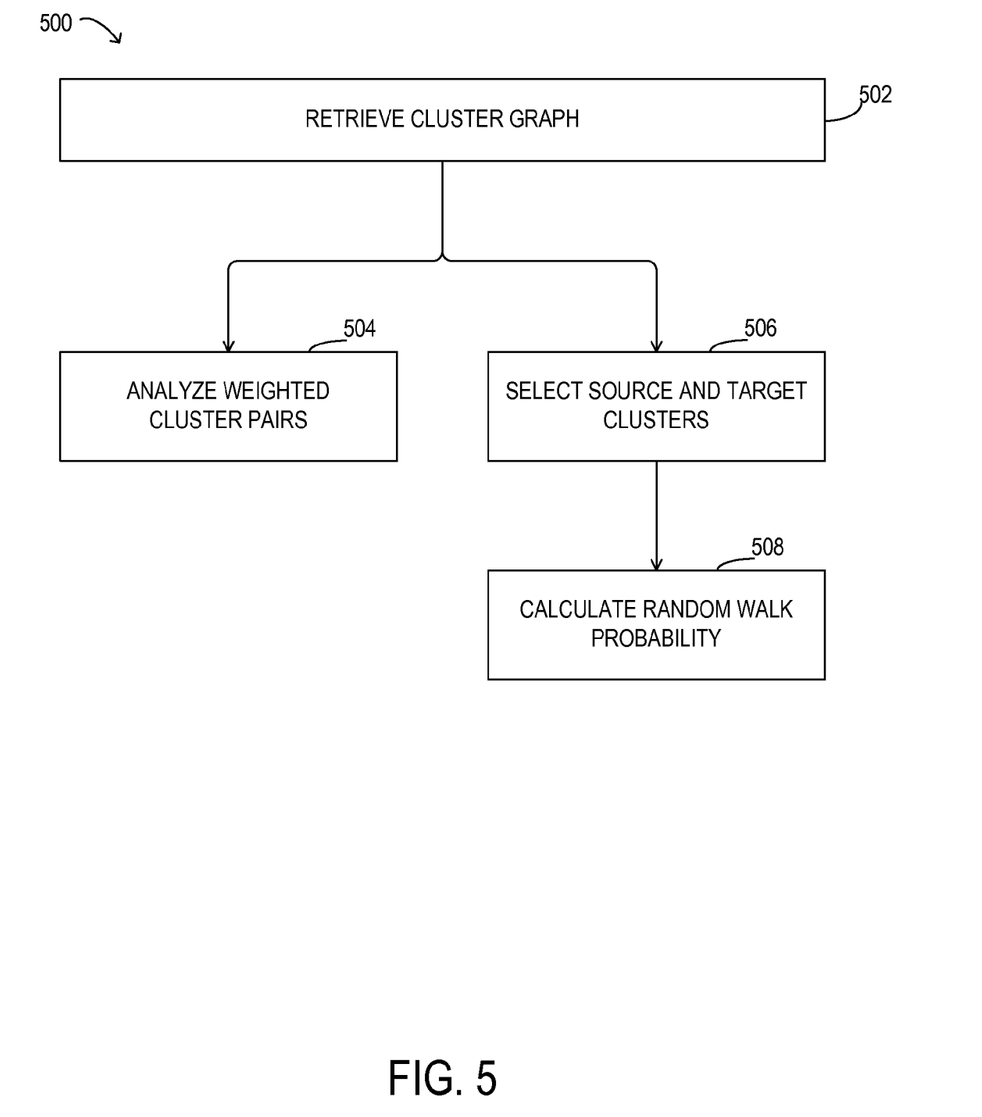
FIG. 5 is a block diagram of selected elements of an embodiment of a cluster graph analysis process.

Turning now to FIG. 5, a block diagram of selected elements of an embodiment of a cluster graph analysis process 500 is depicted. Process 500 may be executed after storing the cluster graph in operation 408 in process 400. The cluster graph may be retrieved from a storage device (operation 502). In process 500, two parallel process paths are shown as options.

As one option in process 500, the weighted cluster pairs in the cluster graph may be compared, or otherwise analyzed (operation 504). The analysis in operation 504 may be performed by a machine or a human, for executing queries in the database. Additional analyses, such as performing statistics on the weightings or generating a list of important tables, using the cluster graph may be performed during operation 504.

Another option in process 500 involves selecting a source and target cluster in two different tables of the database (operation 506). The source and target clusters may be chosen randomly, and/or may be separated by a number of intermediate tables, such that the aggregate join path between them is not immediately evident. The probability that a random walk from the source cluster will reach the target cluster is then calculated (operation 508). A "random walk" involves randomly selecting a join edge or relationship at each cluster to advance to another cluster, such that a given cluster is only chosen once for the random walk. The calculated probability may be output to a processing device, or stored for later use. The random walk probability may be calculated for additional, or all, clusters identified in the cluster graph. The calculated probabilities may be expressed in terms of the tables to which the clusters belong. Thus, the random walk probability from a third cluster in a table joined to the table of the source cluster may be calculated to the target cluster. Additional statistical analyses using the cluster graph, such as characterizing clusters by histograms or incorporating semantical considerations within clusters, may also be performed within the scope of process 500. It is further noted that in some embodiments, both operations 504 and 506 may be performed during process 500, either parallel or sequentially.

Figure 6:
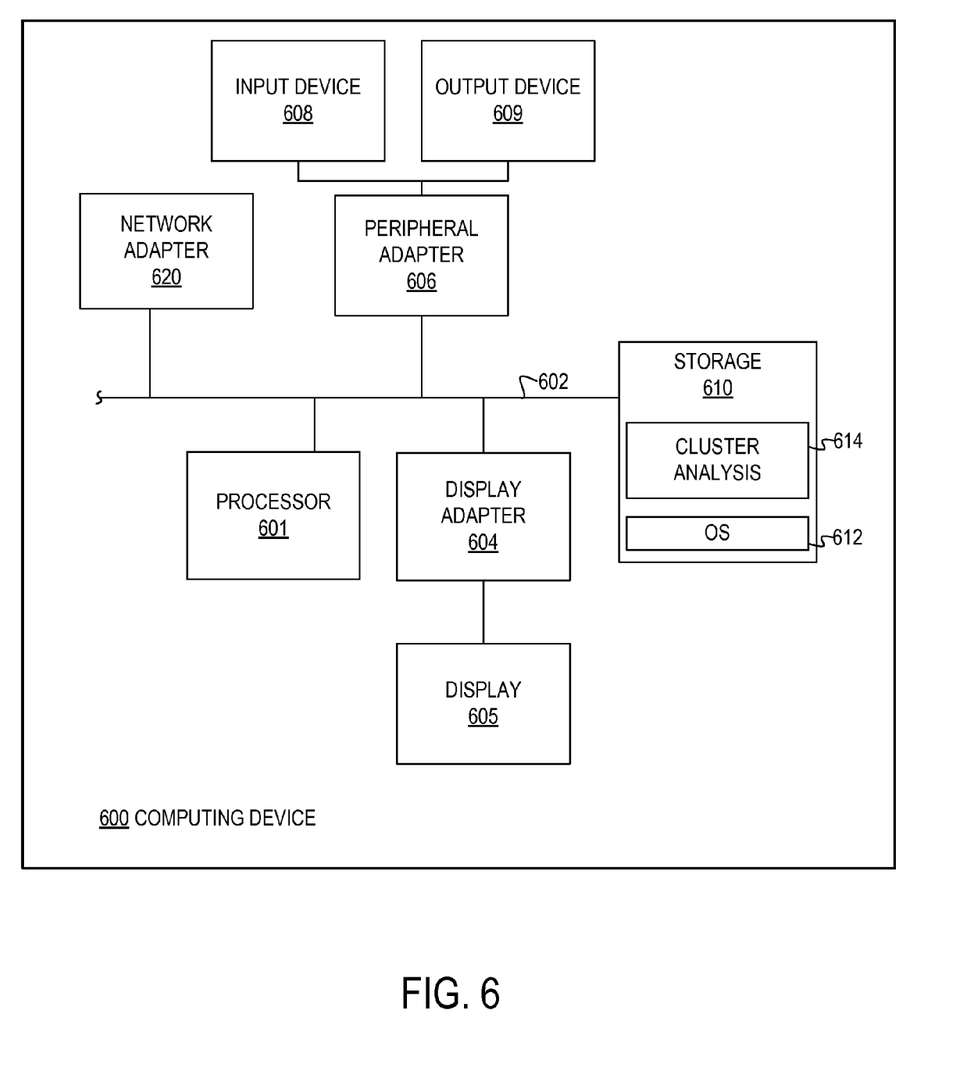
FIG. 6 is a block diagram of selected elements of an embodiment of a computing device.

Referring now to FIG. 6, a block diagram illustrating selected elements of an embodiment of a computing device 600 for performing document translation or conversion is presented. In the embodiment depicted in FIG. 6, device 600 includes processor 601 coupled via shared bus 602 to storage media collectively identified as storage 610.

Device 600, as depicted in FIG. 6, further includes network adapter 620 that interfaces device 600 to a network (not shown in FIG. 6). In embodiments suitable for use in document translation or conversion, device 600, as depicted in FIG. 6, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals.

Device 600 is shown in FIG. 6 including display adapter 604 and further includes a display device or, more simply, a display 605. Display adapter 604 may interface shared bus 602, or another bus, with an output port for one or more displays, such as display 605. Display 605 may be implemented as a liquid crystal display screen, a computer monitor, a television or the like. Display 605 may comply with a display standard for the corresponding type of display. Standards for computer monitors include analog standards such as VGA, XGA, etc., or digital standards such as DVI, HDMI, among others. A television display may comply with standards such as NTSC (National Television System Committee), PAL (Phase Alternating Line), or another suitable standard. Display 605 may include an output device 609, such as one or more integrated speakers to play audio content, or may include an input device 608, such as a microphone or video camera.

Storage 610 encompasses persistent and volatile media, fixed and removable media, and magnetic and semiconductor media. Storage 610 is operable to store instructions, data, or both. Storage 610 as shown includes sets or sequences of instructions, namely, an operating system 612 and a cluster analysis application 614. Operating system 612 may be a UNIX or UNIX-like operating system, a Windows® family operating system, or another suitable operating system.

In some embodiments, storage 610 is configured to store and provide executable instructions for performing document translation or conversion, as mentioned previously. In some instances, storage 610 is configured to store cluster graphs for re-use, comparable to operation 408 in FIG. 4, and retrieve cluster graphs, as in operation 502 shown in FIG. 5. As shown in FIG. 6, device 600 is configured to execute instructions for generating cluster graphs using cluster analysis application 614, analogous to process 300 shown in FIG. 3 and/or process 400 depicted in FIG. 4. In some embodiments, cluster analysis application 614 is further configured to execute process 500 shown in FIG. 5.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for mapping relationships in a database, the database including a plurality of tables having a table join structure, wherein the table join structure is indicated by table join edges in a schema graph of the database and wherein each of the plurality of tables includes a corresponding set of records, the method comprising:

for each of the plurality of tables, grouping, by a computer system, a sample of the corresponding set of records into clusters, wherein records grouped in a cluster instantiate a common set of table join edges;

identifying cluster pairs, wherein a cluster pair corresponds to two clusters from different tables, wherein the two clusters instantiate a common table join edge;

weighting the cluster pairs according to a number of records that instantiate the common table join edge;

filtering any cluster pairs weighted below a threshold weighting, wherein the filtering includes a process selected from excluding the cluster pairs weighted below the threshold and combining each cluster associated with each cluster pair weighted below the threshold weighting with another cluster;

selecting a source cluster from a first table and a target cluster from a second table, wherein the first table and second tables are different tables;

selecting a third table in the database, wherein the third table shares a table join edge with the first table; and determining a relative frequency, with respect to the first table, with which the second table is reached from the third table.

2. The method of claim 1, wherein each sample is a random sample of records in a given table, and wherein a sample size of each sample is proportional to a total number of records for the given table.

3. The method of claim 1, wherein the table join structure is limited to a maximum number of table join edges.

4. The method of claim 1, further comprising:
displaying a cluster graph indicative of the cluster pairs and their corresponding weightings on a display device.

5. The method of claim 1, further comprising:
calculating a probability that a random walk from the source cluster will reach the target cluster, wherein the random walk includes randomly selecting table join edges to advance between neighboring clusters, such that a given cluster is not selected more than once for the random walk.

6. A computer system for generating a cluster graph of a database, the database including a plurality of tables having a table join structure, wherein the table join structure is indicated by table join edges in a schema graph of the database, wherein each of the plurality of tables includes a corresponding set of records, the computer system comprising:

a processor; and memory media, accessible to the processor, including processor executable program instructions, the program instructions including instructions to:

determine, for each given table in the plurality of tables, nearest neighbor table join edges associated with each record in a sample of records from the given table;

group the sample of records for each given table into clusters based on the nearest neighbor table join edges;

identify cluster pairs, wherein a cluster pair corresponds to two clusters from different tables of the database, wherein the two clusters instantiate a common table join edge;

weight the cluster pairs according to a number of records that instantiate the common table join edge;

filter any cluster pairs weighted below a threshold weighting, wherein the filtering includes a process selected from excluding the cluster pairs weighted below the threshold and combining clusters in each cluster pair weighted below the threshold weighting with a different cluster;

select a source cluster from a first table and a target cluster from a second table, wherein the first table and second tables are different tables;

select a third table in the database, wherein the third table shares a table join edge with the first table; and determine a relative frequency, with respect to the first table, with which the second table is reached from the third table.

7. The computer system of claim 6, further comprising:
a storage device; and
a display device,
wherein the program instructions include instructions to:
limit a number of table join edges in the table join structure to a predetermined maximum; and
display the cluster graph on the display device.

8. The computer system of 6, wherein a sample size of each of the sample of records is based at least in part on a number of records in a corresponding table.

9. The computer system of 6, further including processor executable instructions to:
calculate a probability that a random walk from the source cluster will reach the target cluster, wherein the random walk includes randomly selecting table join edges to advance between neighboring clusters, such that a given cluster is not selected more than once for the random walk.

10. The computer system of 9, further including processor executable instructions to:
compare join relationships between the first table and the second table based on the probability.

11. The computer system of 9, wherein the instructions to determine the relative frequency include instructions to determine the relative frequency based on the probability.

12. A non-transitory computer-readable memory, including program instructions, executable by a processor, for generating cluster graphs of databases, the program instructions including instructions to:
group records within each of a plurality of database tables into clusters based on matching nearest neighbor table join edges, wherein a first cluster associated with a first table shares a join relationship with a second cluster associated with a second table, wherein the first cluster and the second cluster form a cluster pair;
identify cluster pairs for clusters in the database;
weight the cluster pairs according to a number of records that instantiate the join relationship shared by the first cluster and the second cluster;
apply a weighting threshold to the cluster pairs, wherein cluster pairs weighted below the weighting threshold are excluded from the ordered clusters;
select a source cluster from a first table and a target cluster from a second table, wherein the first table and second tables are different tables;
select a third table in the database, wherein the third table shares a table join edge with the first table; and
determine a relative frequency, with respect to the first table, with which the second table is reached from the third table.

13. The memory media of 12, wherein the program instructions include instructions to:
calculate a probability that a random walk from the source cluster will reach the target cluster, wherein the random walk includes a random selection of table join edges to advance between tables, such that a given cluster is not selected more than once for the random walk.

14. The memory media of 13, further including processor executable instructions to:
compare the join relationships between the first table and the second table based on the probability.

15. The memory media of 13, wherein the instructions executable to determine the relative frequency include:
instructions to determine the relative frequency based on the probability.

16. The memory media of 13, wherein the program instructions include instructions to:
repeat the program instructions to select and to calculate, wherein a different target cluster is selected from among the clusters calculate a plurality of probabilities corresponding to the plurality of tables in the database.

17. The memory media of 16, further including processor executable instructions to:
compare join relationships between the plurality of tables in the database based on the plurality of probabilities.

18. A method for identifying meaningful join paths in a relational database having a plurality of tables, each table having a set of records, comprising:
identifying clusters in the tables, wherein records within a cluster all instantiate a common set of neighboring join edges;
identifying cluster pairs, wherein a cluster pair includes a first cluster from a first table and a second cluster from a second table and further wherein the first cluster and the second cluster share a join relationship;
for at least some of the identified cluster pairs, determining a number of records in the first cluster and the second cluster that instantiate the join relationship shared;
storing a cluster pair matrix indicative of the cluster pairs and their corresponding numbers of records;
weighting the cluster pairs according to their corresponding number of records, wherein a threshold is applied to the weighted cluster pairs, wherein weighted cluster pairs below the threshold are not included in the cluster pair matrix;
selecting a source cluster from a first table and a target cluster from a second table, wherein the first table and second tables are different tables;

selecting a third table in the database, wherein the third table shares a table join edge with the first table; and determining, based on the probability, a relative frequency, with respect to the first table, with which the second table is reached from the third table.

19. The method of 18, wherein the identifying of clusters in a selected table is performed for a representative sample of the set of records in the given table.

* * * * *

UNITED STATES PATENT AND TRADEMARK OFFICE
CERTIFICATE OF CORRECTION

| | | |
|---|---|---|
| PATENT NO. | : 8,161,048 B2 | |
| APPLICATION NO. | : 12/463161 | |
| DATED | : April 17, 2012 | |
| INVENTOR(S) | : Cecilia Magdalena Procopiuc and Divesh Srivastava | |

It is certified that error appears in the above-identified patent and that said Letters Patent is hereby corrected as shown below:

In the Claims, col. 10, line 35-40,

Please correct Claim 16 as follows:

16. The memory media of 13, wherein the program instructions include instructions to:

repeat the program instructions to select and to calculate, wherein a different target cluster is selected from among the clusters to calculate a plurality of probabilities corresponding to the plurality of tables in the database.

Signed and Sealed this
Fifth Day of June, 2012

David J. Kappos
*Director of the United States Patent and Trademark Office*